United States Patent
Halkyard et al.

(10) Patent No.: US 9,051,030 B2
(45) Date of Patent: Jun. 9, 2015

(54) UNDERSEA ANCHORING SYSTEM AND METHOD

(75) Inventors: John E. Halkyard, Houston, TX (US); Jonathan B. Machin, Neuilly (FR)

(73) Assignee: Lockheed Martin Corporation, Bethesda, MD (US)

(*) Notice: Subject to any disclaimer, the term of this patent is extended or adjusted under 35 U.S.C. 154(b) by 261 days.

(21) Appl. No.: 13/117,628

(22) Filed: May 27, 2011

(65) Prior Publication Data

US 2011/0293379 A1 Dec. 1, 2011

Related U.S. Application Data

(60) Provisional application No. 61/349,314, filed on May 28, 2010.

(51) Int. Cl.
*E02D 5/54* (2006.01)
*B63B 21/26* (2006.01)
*E02D 27/52* (2006.01)

(52) U.S. Cl.
CPC ............ *B63B 21/26* (2013.01); *E02D 27/52* (2013.01)

(58) Field of Classification Search
CPC .... B63B 21/50; B63B 2021/505; E02D 27/52
USPC .......... 405/224, 227, 228, 232, 244; 175/5–7, 175/10; 166/352, 354, 358; 114/230.2, 293; 11/224, 227, 228, 232, 244
See application file for complete search history.

(56) References Cited

U.S. PATENT DOCUMENTS

| | | | | |
|---|---|---|---|---|
| 3,516,503 A | | 6/1970 | Mayer et al. | |
| 3,741,320 A | * | 6/1973 | Hilfing | 175/6 |
| 3,871,617 A | * | 3/1975 | Majima | 254/29 R |
| 4,120,362 A | * | 10/1978 | Chateau et al. | 166/339 |
| 4,190,120 A | * | 2/1980 | Regan | 175/7 |
| 4,194,857 A | * | 3/1980 | Chateau et al. | 405/203 |
| 4,257,488 A | * | 3/1981 | Schnell | 173/133 |
| 4,445,807 A | * | 5/1984 | Cowan | 405/227 |
| 4,626,138 A | * | 12/1986 | Boyes | 405/232 |
| 4,822,212 A | * | 4/1989 | Hall et al. | 405/227 |
| 5,215,030 A | * | 6/1993 | Conti | 114/298 |
| 5,915,883 A | * | 6/1999 | Kuehn | 405/228 |
| 6,066,015 A | * | 5/2000 | Brown | 441/6 |

(Continued)

FOREIGN PATENT DOCUMENTS

| | | | | |
|---|---|---|---|---|
| EP | 2299006 | | 3/2011 | |
| GB | 2436320 | | 9/2007 | |
| WO | WO 2007066078 A1 | * | 6/2007 | |
| WO | 2007/101311 | | 9/2007 | |
| WO | WO 2007101311 | * | 9/2007 | ..... B63B 21/48 |
| WO | 2011/030167 | | 3/2011 | |

OTHER PUBLICATIONS

Photographs of Marini drill rig attached to a horizontal rail, available at www.mariniqg.it as of Oct. 2009 (1 page).

(Continued)

*Primary Examiner* — Doug Hutton, Jr.
*Assistant Examiner* — Patrick Lambe
(74) *Attorney, Agent, or Firm* — Hamre, Schumann, Mueller & Larson, P.C.

(57) ABSTRACT

An undersea anchor that includes a frame that is fixed to the seafloor by one or more pile anchors, for example grouted pile anchors. The frame is configured to permit it to function with one or more seabed drills to allow the pile anchor(s) to be installed at an angle relative to horizontal so the pile anchors can take horizontal and vertical loads.

20 Claims, 6 Drawing Sheets

(56) References Cited

U.S. PATENT DOCUMENTS

| | | | |
|---|---|---|---|
| 6,068,066 A * | 5/2000 | Byrt et al. | 173/4 |
| 6,223,671 B1 * | 5/2001 | Head | 114/230.2 |
| 6,273,645 B1 * | 8/2001 | Hamre | 405/224.1 |
| 6,325,158 B1 * | 12/2001 | Rangnes et al. | 175/5 |
| 6,354,767 B1 * | 3/2002 | Jones | 405/232 |
| 6,394,192 B1 * | 5/2002 | Frazer | 175/58 |
| 6,895,884 B1 * | 5/2005 | Velazquez | 114/295 |
| 7,585,133 B2 * | 9/2009 | Jones | 405/228 |
| 2005/0117976 A1 * | 6/2005 | Jones | 405/231 |
| 2008/0199259 A1 * | 8/2008 | Cannon | 405/232 |
| 2009/0129870 A1 * | 5/2009 | Jones | 405/228 |
| 2010/0119309 A1 * | 5/2010 | Gibberd | 405/228 |
| 2010/0290839 A1 | 11/2010 | Meller | |

OTHER PUBLICATIONS

Photographs and drawings of prior art anchors in existence possibly as early as May 11, 2010 (2 pages).

Search Report for international application No. PCT/US2011/038344, dated Sep. 20, 2012 (3 pages).

Written Opinion for international application No. PCT/US2011/038344, dated Sep. 20, 2012 (6 pages).

Cover page and contents page, *Sea Technology*, Feb. 1991, vol. 32, No. 2 (2 pages).

* cited by examiner

UNDERSEA ANCHORING SYSTEM AND METHOD

FIELD

An improved undersea anchoring system for anchoring objects in water.

BACKGROUND

Mooring of offshore objects typically requires multiple mooring lines between the platform and the sea floor, and suitable anchors on the sea floor connected to the mooring lines. Mooring systems currently used include catenary mooring illustrated in FIG. 1 and taut mooring illustrated in FIG. 2. FIG. 3 illustrates a known mooring line spread.

In catenary mooring, catenary mooring lines resist horizontal forces by the weight of the lines, which are usually steel chain or wire rope. As the top of the line moves horizontally, the sag in the catenary is reduced and the horizontal restoring force increases. The horizontal stiffness of the line is directly related to the weight of the line relative to the horizontal force.

In taut mooring, taut mooring lines resist horizontal force by stretching. The lines are relatively light (for example synthetic rope), and remain relatively straight under tension. The horizontal stiffness is directly related to the stiffness of the line, not to its weight.

Anchors for these types of moorings must be designed to take the maximum horizontal and vertical loads at the seabed exerted by the lines. Catenary moorings generally are designed so that the anchors do not experience any vertical loads ("uplift"). This requires longer line length ("scope") than a taut mooring, and requires a larger area on the seafloor assigned for the mooring spread, i.e. a larger "foot print". Mooring of offshore objects in deep water in recent years has favored taut moorings because the reduced cost for mooring lines and the smaller foot print. However, taut mooring requires anchors that are able to withstand uplift.

There are many common types of anchors in use today. The drag embedment anchor is commonly used with catenary moorings for temporary systems such as drilling rigs. Most permanent moorings in use today use a taut mooring and a piled anchor, either driven with underwater pile hammers, or installed using a suction principle. These "suction anchors" are installed by setting them vertically on the seabed to create a seal around their base. By pumping water from their interior a large pressure differential is achieved which results in the pile being "sucked" into the seabed.

Many conventional anchors require a thick layer of suitable sediment or sand to function. They are not suitable for rock bottoms, or for areas with highly organic sediment, e.g. coralific or calcareous sediments. For these types of areas, gravity anchors or bored piled anchors are available. Two forms of a gravity anchor include a grillage overlaid with rock or iron ore, or a gravity box filled with ballast. Gravity anchors resist uplift with weight, and horizontal forces with bottom friction.

Gravity anchors need to be very heavy to resist vertical and horizontal loads. If the anchors are deployed in deep water, the only vessels capable of lifting and lowering these heavy anchors may be large derrick vessels costing several hundred thousand dollars per day. Alternately, a lighter box or grillage may be lowered with a smaller cheaper vessel, but ballast must then be installed.

Bored piled anchors typically require an expensive drilling vessel for installation. In addition, bored piled anchors require mooring line attachment above the seabed. It is not generally favorable to attach the mooring line at the top of the pile because of the large bending moment that is imparted to the pile from the eccentricity of the horizontal force. The attachment point is typically below the sea floor, close to the center of the reaction force from the soil. This presents a difficult design issue for piles that are bored into rock, as it becomes impossible to attach the mooring line below the seabed. For this reason, drilled anchors are more commonly used as tension piles.

SUMMARY

An undersea anchoring concept is described that is particularly applicable to a rock bottom or where the sediment thickness is insufficient for a conventional anchor. The undersea anchor can be remotely installed with a seabed drill, eliminating the need for an expensive deep water drilling rig on the surface. In addition, the anchor is designed in a manner that allows most of the mooring force to be taken in the axial direction along a pile, eliminating the bending and shear forces which are associated with a conventional bored pile and mooring. The undersea anchor can be employed with, for example, a taut mooring system to achieve an optimum relationship between the horizontal and vertical forces on the anchor.

In one embodiment, the undersea anchor employs a frame that is fixed to the seafloor by one or more pile anchors, for example grouted pile anchors. The frame is configured to permit it to function with one or more seabed drills, and to orient the drill(s) to allow the pile anchor(s) to be installed at a predetermined angle. For example, the predetermined angle can be an angle relative to horizontal so the pile anchor(s) can take horizontal and vertical loads. In one embodiment, the frame is designed to permit use of a plurality of pile anchors. When grouted pile anchors are used, a system for grouting the pile anchors in deep water can be employed.

The disclosed undersea anchor can be used to anchor any type of object in water, for example floating structures such as an Ocean Thermal Energy Conversion (OTEC) system, a drilling platform, and the like. In addition, the disclosed undersea anchor can be used for anchoring floating objects in any body of water, freshwater or saltwater. Therefore, the terms undersea, seafloor and the like are intended to include freshwater uses as well.

In one embodiment, an undersea anchor includes a frame, a mooring line connection site connected to the frame, and a seabed drill mounting system on the frame permitting mounting of a seabed drill on the frame. The mounting system orients a seabed drill so that the seabed drill can install a pile anchor in the seabed at a predetermined angle. The seabed drill is used to install at least one pile anchor that is connected to the frame, with the pile anchor being disposed at the predetermined angle. In one embodiment, the pile anchor extends at an angle that is generally parallel with a resultant load direction of a mooring line that is connected to the frame.

The mounting system permits adjustment of the position of the seabed drill on the frame so that the seabed drill can install a plurality of the pile anchors. The mounting system can be any system allowing adjustment of the drill position, for example a pair of parallel U-shaped rails. The frame can include a pair of the parallel U-shaped rails on first and second sides of the frame.

In one embodiment, when the pile anchors are at an acute angle, the pile anchor(s) can extend at an angle of greater than or equal to about 20 degrees but less than about 90 degrees relative to horizontal.

An anchoring method includes placing a frame, that includes a mooring line connection site, on the sea floor. A seabed drill is installed on the frame so that the seabed drill can install a pile anchor in the seabed at a predetermined angle relative to horizontal. The seabed drill is used to install a pile anchor at the predetermined angle, and the installed pile anchor is then connected to the frame.

DRAWINGS

FIGS. 4A-D are perspective, top, side and end views, respectively, of an undersea anchor disclosed herein.

Figure 1:
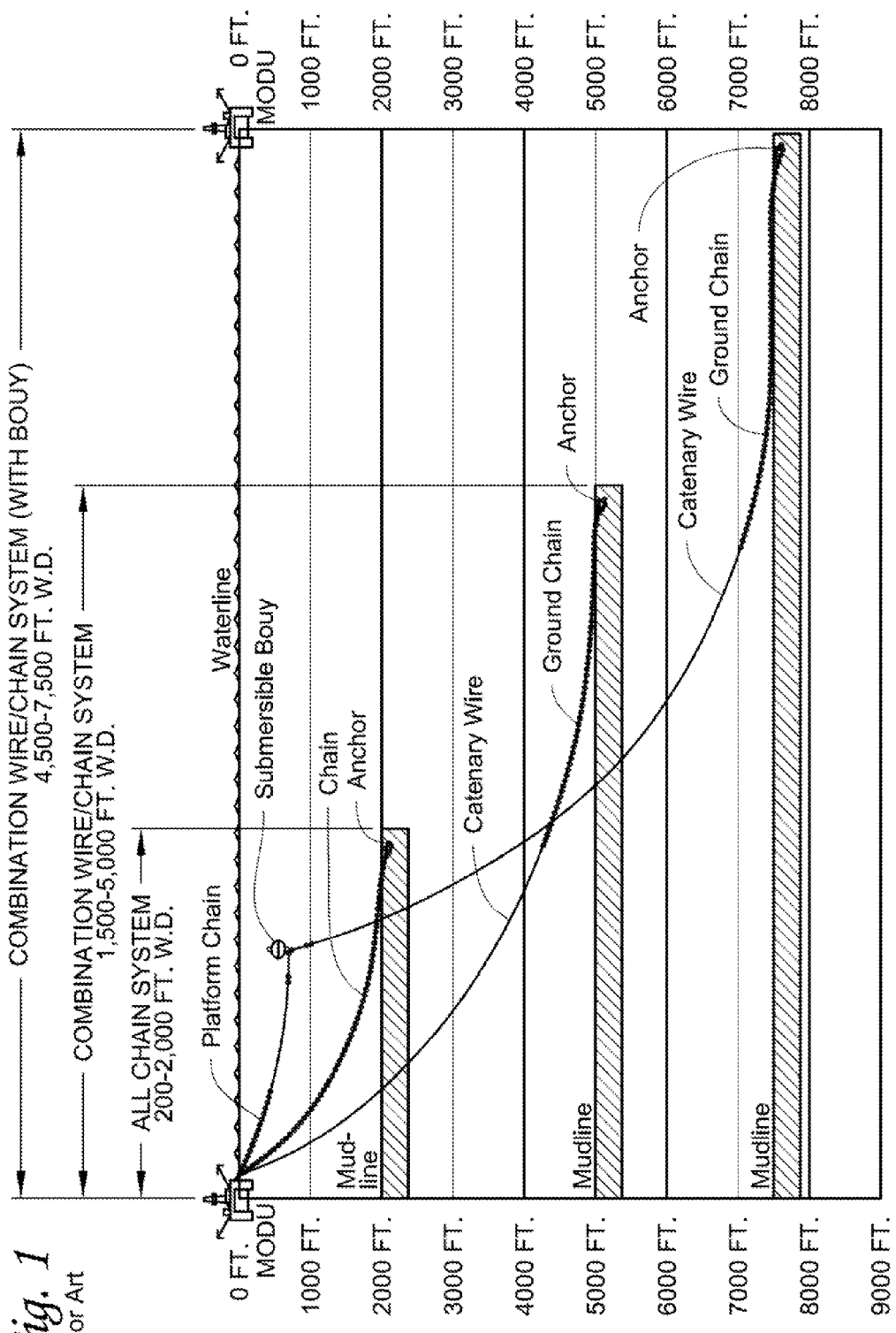
FIG. 1 illustrates a conventional catenary mooring concept.
Figure 2:
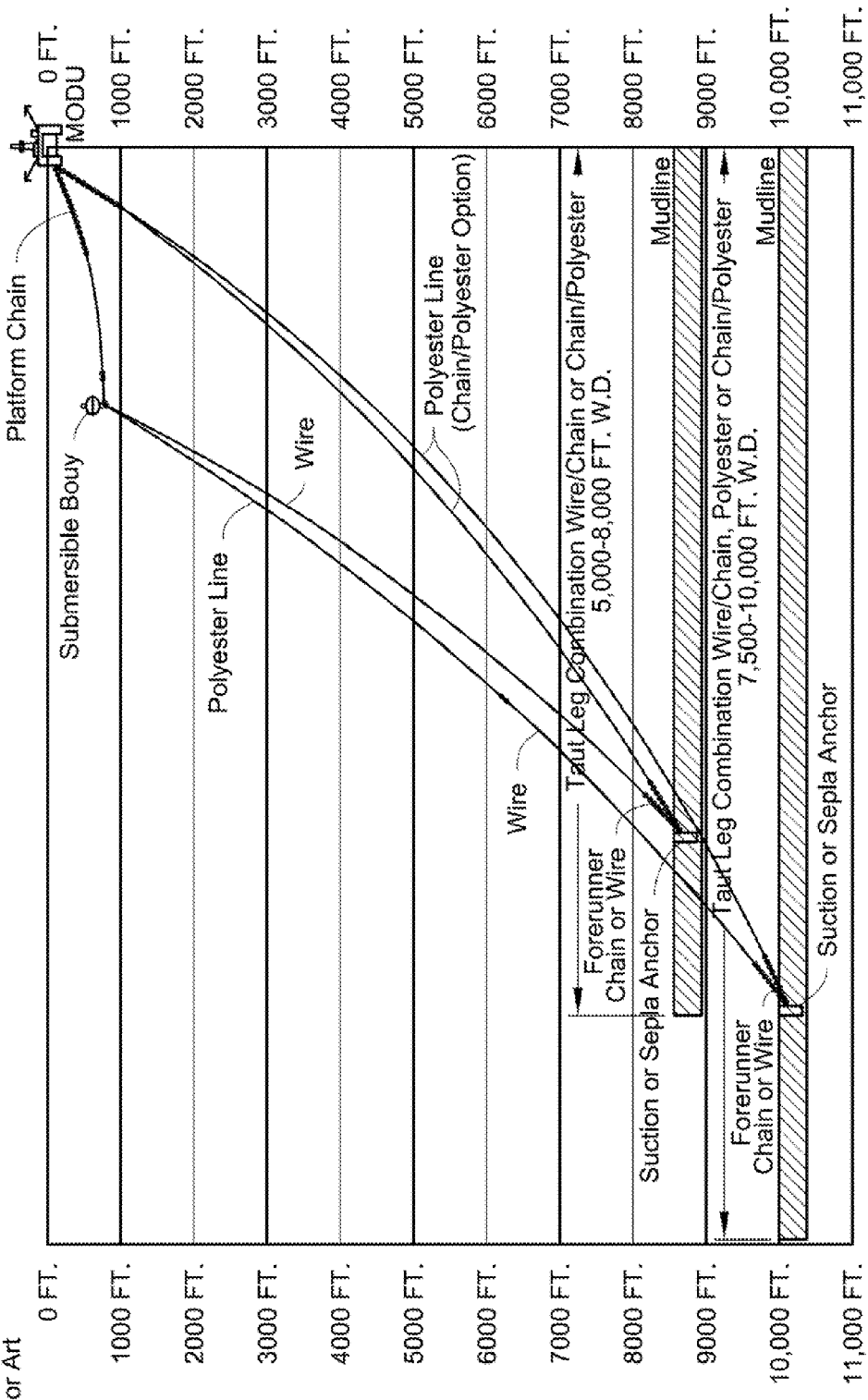
FIG. 2 illustrates a conventional taut mooring concept.
Figure 3:
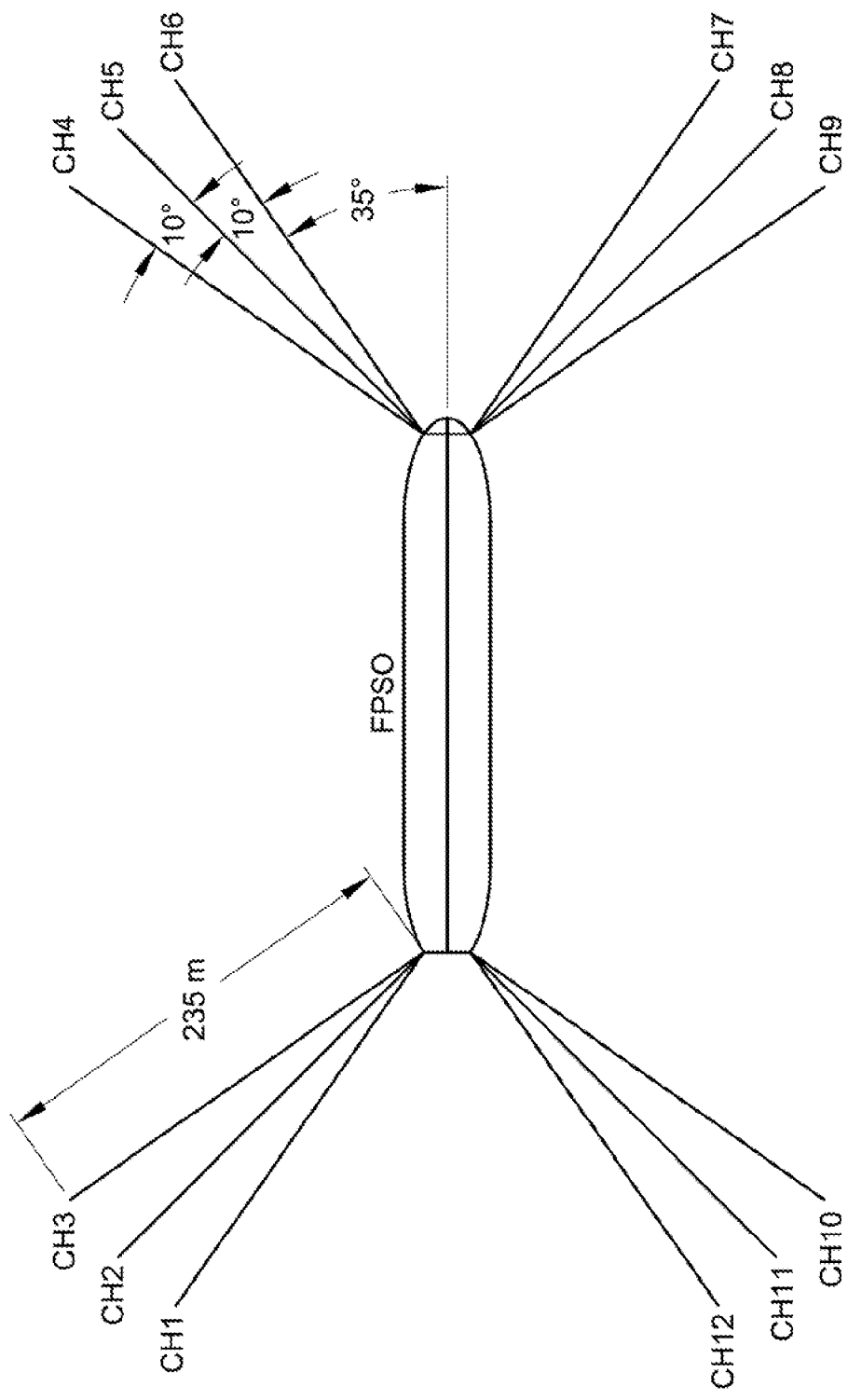
FIG. 3 illustrates a conventional mooring line spread of a conventional mooring system.
Figure 4B:
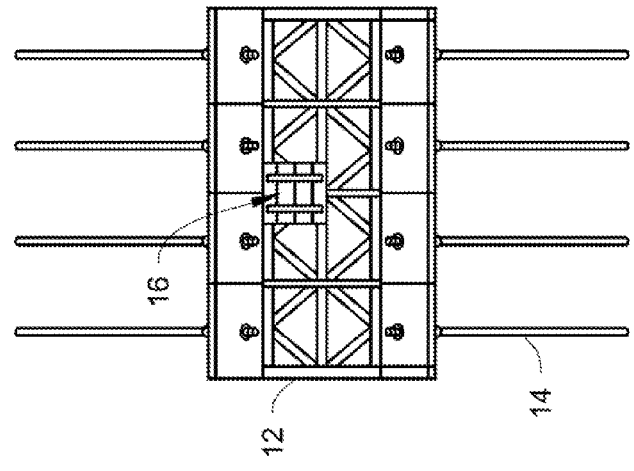
Figure 4D:
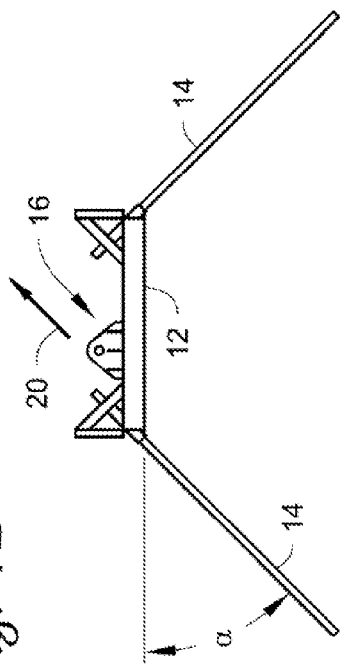
Figure 4A:
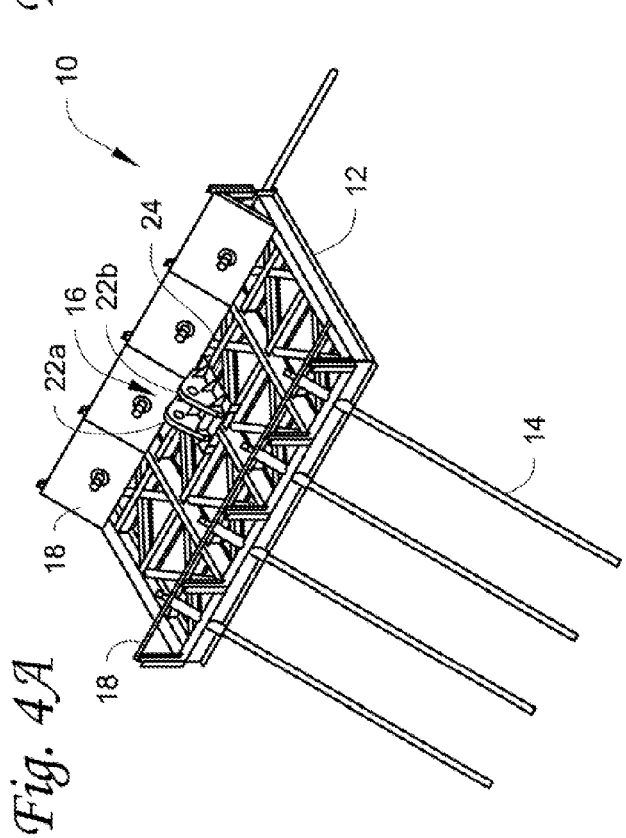
Figure 4C:
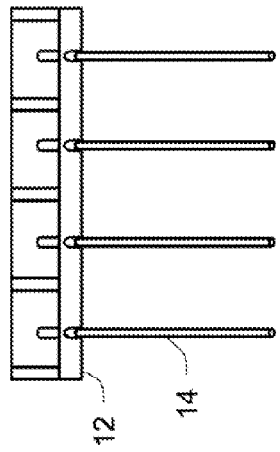
Figure 5:
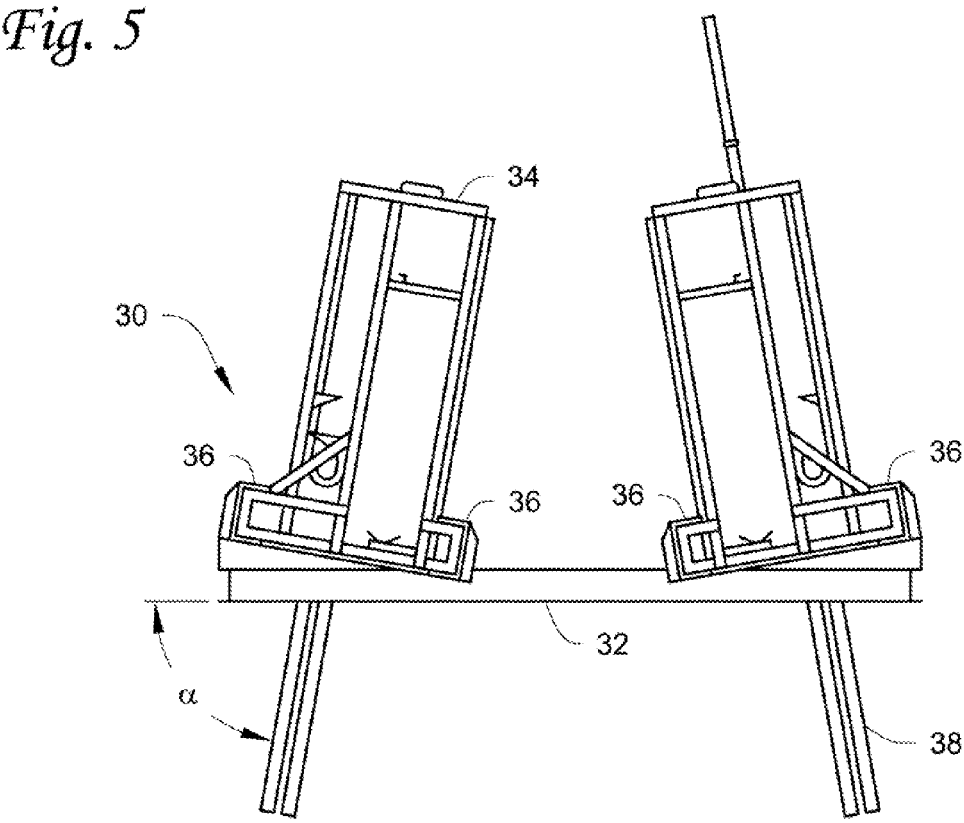
Figure 6:
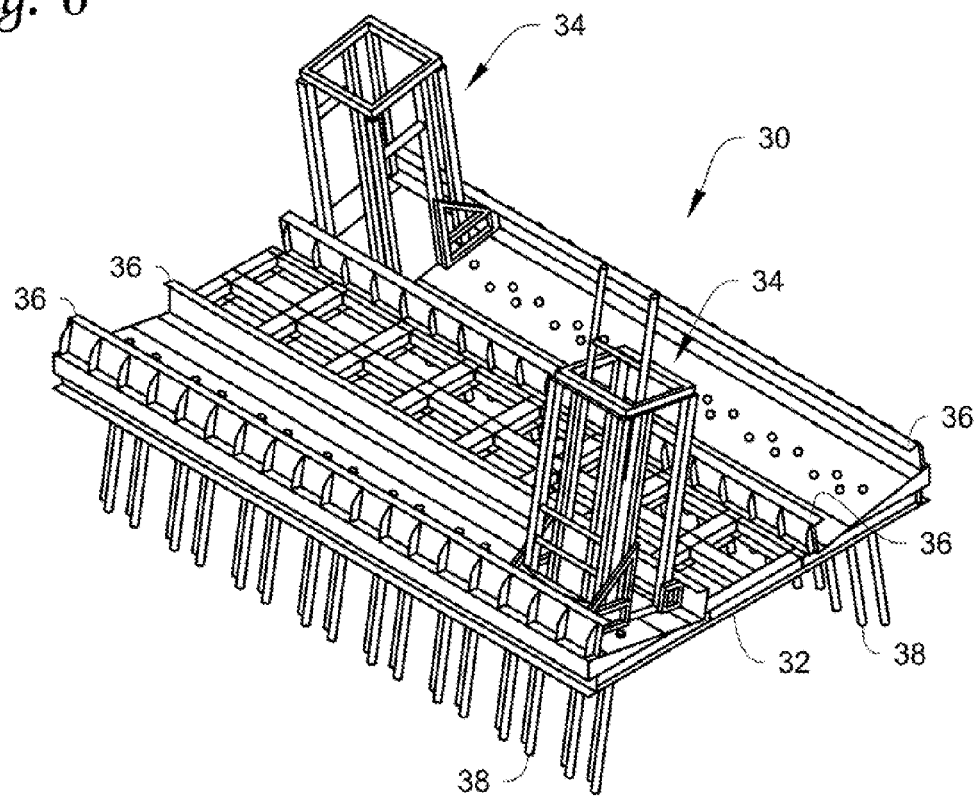

FIGS. 5 and 6 illustrate a pair of seabed drills engaged with the anchor for installing the pile anchors.

Figure 7:
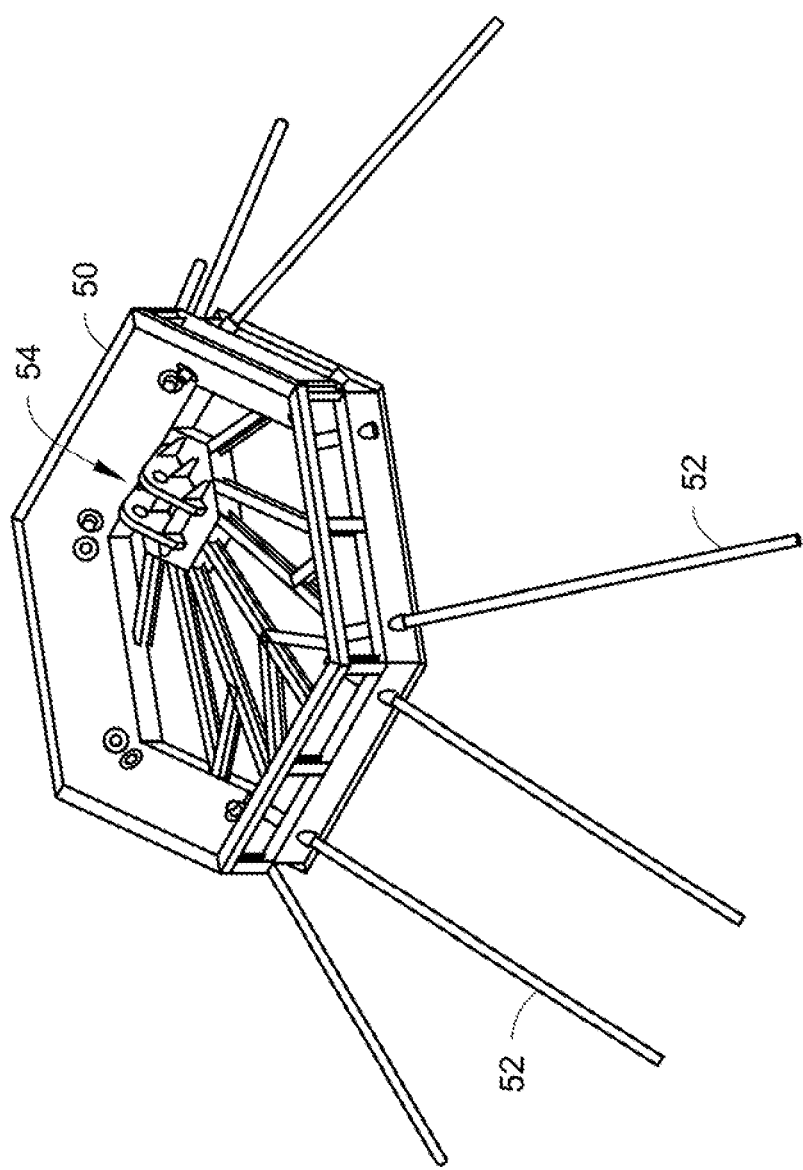

FIG. 7 illustrates another embodiment of an undersea anchor disclosed herein.

DETAILED DESCRIPTION

With reference to FIGS. 4A-D, a new undersea anchor 10 is illustrated. The anchor 10 includes a frame 12 intended to rest on the seafloor, and one or more pile anchors 14 that fix the frame 12 to the seafloor. The anchor 10 is particularly suited for use on seafloors that are primarily flat rock, or where the sediment thickness is insufficient to allow use of conventional embedment or suction anchors.

In the illustrated example, the frame 12 is generally rectangular in shape, comprised of a latticework of steel beams (or beams of other suitable material), and uses eight pile anchors 14. In this example, the bottom of the frame 12 is generally flat, allowing the frame to rest on a generally flat seafloor. The bottom of the frame 12 could have other configurations to generally correspond to the contour of the seafloor on which the frame will be disposed. The frame 12 also includes a mooring line connection site 16 formed by a pair of flanges 22a, 22b on a plate 24 that is suitably fixed to the top of the frame 12. Other mooring line connection configurations could be employed. In addition, additional mooring line connection sites could also be provided on the frame 12.

Along opposing sides of the frame 12, angled walls 18 are formed. The walls 18 form connection sites for connecting the ends of the pile anchors 14 to the frame. The walls 18 are disposed at angles such that the planes of the walls are generally perpendicular to the longitudinal axes of the pile anchors 14.

The pile anchors 14 are for example grouted pile anchors, oriented and configured to take both vertical and horizontal loads. Although eight pile anchors 14 are illustrated, a larger or, lesser number of pile anchors could be used, based in part on the particular application of the anchor 10 and the anticipated loads. In addition, although FIGS. 4A-D illustrate four pile anchors on each side, the number of pile anchors on each side of the frame may vary and need not be equal on each side.

The pile anchors can extend at any predetermined angle. In the illustrated embodiment, the pile anchors extend at an acute angle $\alpha$ relative to horizontal. In the illustrated embodiment, the pile anchors extend at the same angle $\alpha$ relative to horizontal. For example, the pile anchor(s) can extend at an angle $\alpha$ of greater than or equal to about 20 degrees but less than about 90 degrees relative to horizontal. In one embodiment, the angle $\alpha$ can be about 45 degrees.

In one embodiment, the longitudinal axis of at least one of the pile anchors 14 is generally parallel to the mooring line resultant load direction, designated by arrow 20. In the example illustrated in FIGS. 4A-D, the longitudinal axis of four of the pile anchors 14 on one side of the anchor 10 are generally parallel to the mooring line resultant load direction 20. Thus, the anchor 10 is particularly suited for use with a taut mooring line system. This also allows optimization of the mooring line design, by permitting use of steeper, more vertical/less horizontal mooring line design which results in reduced length of mooring line. Since mooring line is a very specialized product which is expensive to manufacture, a shorter mooring line may reduce the cost of the mooring line. However, the anchor 10 can be used with mooring line systems other than taut mooring line systems.

In addition, the size and configuration of the pile anchors 14 can vary depending in part on loading, as well as the number of pile anchors 14 that are used. However, in the illustrated embodiment, it is believed that pile anchors between about 100 mm to about 200 mm in diameter, and approximately 12 m long would suffice. The length can change based on the composition and strength of the seabed. In another embodiment, a spacing of the pile anchors 14 can be, for example, at least about 8 times the pile anchor diameter to avoid interaction effects and maximize the load carrying efficiency of the pile anchors.

An example of a suitable grouted pile anchor useable with the frame 12 is the Ischebek Titan 103/51. Grouted piles are a well established anchoring technique in onshore civil engineering construction applications. The piles are drilled into the ground using a tubular pipe with a sacrificial drill bit on the end. Once the pile reaches the desired depth, drilling is stopped. Fluid grout is then pumped into the tubular pipe and exits through drainage holes in the pipe and/or drill bit. The fluid grout then fills the annular spacing between the tubular pipe and the borehole wall in the ground. Once the grout sets the tubular pile is bonded to the ground.

The frame 12 is designed to interact with one or more seabed drills to allow the angled piles to be installed. A means of configuring the frame 12 to interact with the seabed drill will be described below with respect to FIGS. 5 and 6. The seabed drill needs to be capable of drilling the pile anchors into the seabed. The seabed drill handles the functions of rotating and/or hammering the pile anchors, driving them into the seabed, racking the stock of pile anchors and pile anchor components, and assembling lengths of the pile anchor and pile anchor components as the drill penetrates the seabed. Suitable seabed drill rigs are known, although they are mainly used for seabed coring and sampling. An example of a suitable seabed drill rig is the ROVDRILL M80, manufactured by Seafloor Geoservices of Houston, Tex. By using a seabed drill, the need for an expensive deep water drilling rig on the surface is eliminated.

FIGS. 5 and 6 illustrate an embodiment of an undersea anchor 30 with a frame 32 configured to interact with a seabed drill 34. In this embodiment, each side of the frame 32 includes a pair of parallel, U-shaped rails 36 extending along the length thereof. The open faces of the rails 36 face each other so as to form guide channels for receiving and guiding edges of the seabed drill 34. This permits the drill 34 to be positioned at different positions along the frame 32. A similar rail system can be employed on the frame 12 illustrated in FIGS. 4A-D, on one or both sides thereof, for mounting one or more seabed drills.

In addition, each side of the frame 32 is angled so that when the seabed drill 34 is mounted in the guide channel, the drill 34 is oriented at the correct angle for drilling pile anchors 38 into the seabed at the desired angle $\alpha$. Other mechanisms for allowing the seabed drill to interact with the frame for drilling the pile anchors at the appropriate angle can be used. FIGS. 5 and 6 illustrate a pair of drills 34 working simultaneously, each on a set of rails 36, and each attached to match the desired angle of the pile anchors. However it is contemplated that only a single drill could be deployed.

The grout for the pile anchor can be prepared and mixed on a surface support vessel and pumped down to the seabed drill rig. The grout can then be pumped into the tubular pile as discussed above. This is a well known process in the oil & gas industry where tubular oil well casings and pipes are regularly grouted into the seabed. Alternatively, the grout could be mixed at or near the seafloor. A pressure control system can be used to control the grout pressure and avoid the risk of seabed hydro-fracture. Seabed hydro-fracture is not desired as it may degrade the strength of the seabed soil or rock and therefore compromise the strength of the pile anchors.

Although not illustrated in FIGS. 5 and 6, the anchor 30 would also include one or more mooring line connection sites for connecting one or more mooring lines to the anchor 30. The mooring line connection site(s) could be similar to the connection site 16 in FIGS. 4A-D or could be configured in any manner to permit connection of one or more mooring lines.

FIGS. 4A-D and 5-6 show the frame as being generally rectangular. However many different frame shapes are possible. For example, FIG. 7 illustrates a frame 50 that is generally polygonal, for example six-sided. The frame could also be generally circular. A polygonal or circular design may be beneficial by permitting a single seabed drill to be mounted on the frame 50, such as by using the rail system discussed for FIGS. 5 and 6, so that the single seabed drill could potentially install all of the pile anchors without having to removed the drill and remount the drill on the frame 50. At least one of the pile anchors 52 in FIG. 7 is oriented such that it is generally parallel to the mooring line resultant load direction of a mooring line connected to the mooring line connection site 54.

Different drilling orientation angles are also possible. FIGS. 5 and 6 illustrate an angle α from horizontal that is larger than the angle illustrated in FIG. 4D. By angling the pile anchors, most of the mooring force is taken in the axial or longitudinal direction of the pile anchor, minimizing and perhaps eliminating the bending and shearing forces normally associated with bored pile anchors.

In order to ensure the integrity of the anchor frame with grouted pile anchors once it has been installed, a number of quality control operations may be carried out. For example, to obtain and verify the tensile capacity for a single application, a remote controlled pull out test can be performed. In this test, a jacking system with load monitoring equipment can be used to pull against the pile, reacting from the frame, and the load capacity of the pile can thus be verified. This test creates a tensile load. A lateral push/pull test can also be performed between two adjacent working piles in order to verify the lateral capacity. All tests can be performed at a uniform rate of load application or alternatively they may be performed cyclically or indeed to simulate any pre-planned load regime. The ability to perform these tests is provided by the rail mounting system used for mounting the seabed drill on the frame, where the testing equipment can be configured to mount on the frame in the same manner as the seabed drill(s).

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An undersea anchor, comprising:
   a plurality of pile anchors;
   a seabed drill; and
   a frame having:
      one or more angled walls with connection sites for connecting ends of the pile anchors to the frame; and
      a mounting system with at least one pair of rails connected to the one or more angled walls with a guide channel that receives and guides the seabed drill, wherein the mounting system orients the seabed drill to move along the rails and install each of the pile anchors in the seabed at a corresponding connection site without removing and remounting the seabed drill.

2. The undersea anchor of claim 1, wherein the pile anchors are each disposed at a predetermined angle.

3. The undersea anchor of claim 1, wherein the mounting system comprises a pair of parallel U-shaped rails.

4. The undersea anchor of claim 1, further comprising a connection site on the frame for connecting to an object to be anchored to the frame.

5. The undersea anchor of claim 4, wherein the connection site comprises a mooring line connection site, and at least two of the pile anchors each have a longitudinal axis that is generally parallel to a mooring line resultant load direction.

6. The undersea anchor of claim 1, wherein the pile anchors are grouted pile anchors.

7. The undersea anchor of claim 1, wherein at least two of the pile anchors are parallel to each other.

8. The undersea anchor of claim 1, wherein the one or more walls are oriented to have a plane that is perpendicular to longitudinal axes of the pile anchors, and the ends of each of the pile anchors are fixed directly to the wall.

9. An undersea anchor system, comprising:
   a frame;
   a pile anchor drill; and
   a pile anchor drill mounting system on the frame having at least one pair of rails with a guide channel, the pile anchor drill is mounted on the pile anchor drill mounting system via the guide channel, the mounting system extends between multiple pile anchor sites on at least one side of the frame and orients the pile anchor drill on the frame so that the pile anchor drill can install a plurality of pile anchors in the seabed, the mounting system permits linear adjustment of the position of the pile anchor drill on the frame so that the pile anchor drill can be moved along the frame to the pile anchor sites to install the plurality of pile anchors.

10. The undersea anchor system of claim 9, wherein the pile anchor drill is oriented on the pile anchor drill mounting system at an angle to install the pile anchors at a predetermined angle.

11. The undersea anchor system of claim 9, wherein the frame includes a wall that extends from one of the pile anchor sites to another one of the pile anchor sites, the wall is oriented such that it has a plane that is perpendicular to longitudinal axes of the pile anchors.

12. The undersea anchor system of claim 9, further comprising a connection site on the frame for connecting to an object to be anchored to the frame.

13. A method of anchoring an object to a sea floor, comprising:
   placing a frame on the sea floor, the frame including an object connection site, one or more angled walls, and a mounting system;

the mounting system comprising at least one pair of rails connected to the one or more angled walls and comprising a guide channel;

installing a pile anchor drill on the frame via the guide channel of the mounting system so that the pile anchor drill can install a plurality of pile anchors on at least one side of the frame in the seabed; and using the pile anchor drill to install a first pile anchor at a first pile anchor site, and connecting the installed first pile anchor to the frame;

linearly adjusting the position of the pile anchor drill on the frame via the mounting system to a second pile anchor site along the frame;

using the pile anchor drill to install a second pile anchor at the second pile anchor site parallel to the first pile anchor, and connecting the installed second pile anchor to the frame.

14. The method of claim 13, wherein the object to be anchored is a mooring line, and further comprising connecting the mooring line to the connection site so that the first and second pile anchors each have a longitudinal axis that is generally parallel to a resultant load direction of the mooring line.

15. The method of claim 13, wherein the mounting system extends from the first pile anchor site to the second pile anchor site.

16. An undersea anchor, comprising:

a frame;

a mounting system with at least one pair of rails connected to the frame with a guide channel between the rails;

a pile anchor drill mounted on the frame within the guide channel and movable along the frame in a linear direction to different positions to install pile anchors at a plurality of pile anchor sites;

a plurality of pile anchors connected to the frame at the pile anchor sites on at least one side of the frame, at least two of the pile anchors are parallel to each other; and the frame includes a wall that is oriented such that it has a plane that is perpendicular to longitudinal axes of the pile anchors, and each of the pile anchors has an end that is fixed directly to the wall.

17. The undersea anchor of claim 16, wherein the pile anchors are grouted pile anchors.

18. The undersea anchor of claim 16, wherein the mounting system permits linear adjustment of the position of the pile anchor drill on the frame so that the pile anchor drill can be moved along the frame to the pile anchor sites to install the plurality of pile anchors.

19. The undersea anchor of claim 18, wherein the pile anchor drill mounting system extends from one of the pile anchor sites to another one of the pile anchor sites.

20. The undersea anchor of claim 16, further comprising a connection site on the frame for connecting to an object to be anchored to the frame.

* * * * *